J. A. STEVENS.
LENS FOR LAMPS.
APPLICATION FILED JULY 24, 1911.

1,031,207.

Patented July 2, 1912.

Witnesses
E. Alder
E. Wieland

Inventor
John Alfred Sterens
by Carl Tewes
His Attorney.

UNITED STATES PATENT OFFICE.

JOHN ALFRED STEVENS, OF RAYNES PARK, ENGLAND.

LENS FOR LAMPS.

1,031,307.

Specification of Letters Patent.

Patented July 2, 1912.

Application filed July 24, 1911. Serial No. 640,307.

*To all whom it may concern:*

Be it known that I, JOHN ALFRED STEVENS, a subject of the King of England, and resident of Raynes Park, Surrey, England, have invented Lenses for Lamps, of which the following is a specification.

This invention has reference to certain new and useful improvements in lenses for lamps and relates more particularly to my British Patent No. 5191 of 1904. In such construction of lamps it is necessary to hold the lens to the lamp, so that the lamp-body or casing be extended right up the side of the lens and turned over at the edge to hold the lens in place, and by this method of fixing the lamp casing is not illuminated in any manner nor could light, other than the rays of light projecting from the face of the lens be seen.

Now the object of my present invention is to construct such a lens that not only are the rays of light projected through the face of the lens but the illumination is also extended to the back of the lens without loss to the light projected from the front of the lens, thus rendering the lens suitable for many purposes where greater area of illumination is required this applying more particularly to illumination in connection with diving operations.

Figure 1:
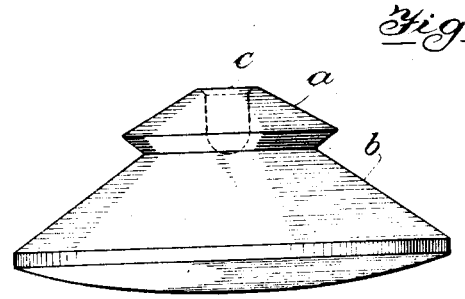
Figure 2:
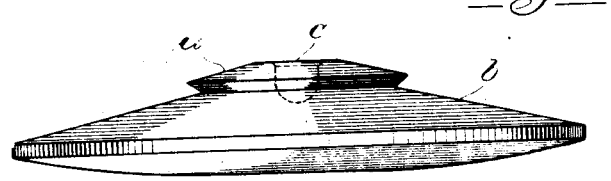
Figure 3:
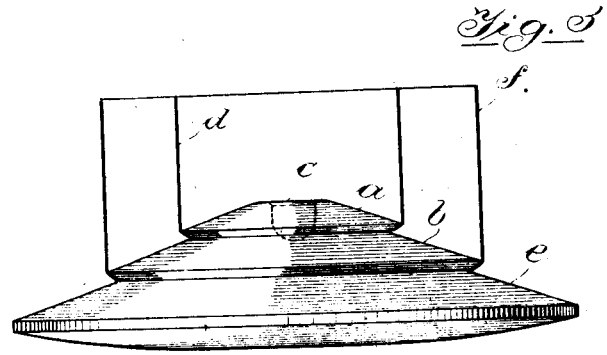

In order that this invention may be more clearly understood, reference is made to the accompanying drawing, in which:

Figure 1 shows a view of a lens in a first form of construction, this lens being applicable for the illumination of small rooms, railway carriage compartments and the like. Fig. 2 shows a view of a lens, in a second form of construction, and intended for large rooms and spaces. Fig. 3 illustrates a view of a lens of a third construction, specially adapted for diving operations, showing the attachment to a double cylindrical casing which in turn may be secured to or form part of the lamp-body, not shown.

In carrying out my invention, instead of forming the back of the lens as in my previous patent in one cone, I form same in two cones $a$ and $b$, Fig. 1, both preferably with the angles or curves in a parallel direction and opening outward, the cone from the edge of the hole $c$ where the lamp is inserted reaching to a line preferably at or near to the end of the lamp hole and the other cone running from this line to the front of the lens. By this means the larger portion of the smaller cone surrounding the lamp hole forms a flange by which the lens can be connected to the lamp-body (not shown) in any known manner and if I silver the back of the smaller cone and leave the back of the larger cone clear I get a brilliant illumination through the front of the lens and sufficient illumination through the back of the larger lens for ordinary purposes.

In the modification, Fig. 2, the lens is of a flat form and designed so as to be more particularly adapted for use in large rooms and open spaces, the shoulder between the two cones being formed for the reception of clamps or the like suspended by chains or other suitable supports secured to the ceiling or standards.

In the third modification I form the back of the lens with three cones, the shoulder between the cones $a$ and $b$ being as previously described designed to receive the supporting means, in this case a casing $d$ which may be secured to or form part of the lamp-body. The shoulder between the cones $d$ and $e$ serves to provide the means for attachment of a casing $f$ which is also secured to the lamp-body or may form part of same, both casings being arranged so that any admission of water to the cavity $c$ is prevented.

It is naturally understood that I may vary the shape of the cones or lenses and the mounting or suspending of the latter without departing from the spirit of the invention.

Having now fully described my said invention what I claim and desire to secure by Letters Patent is:—

The herein described lens for lamps, comprising in combination a plurality of integral cones which are in alinement with one another and which have shoulders formed between their bases and tops respectively, the cone nearest to the apex of the lens being silvered and provided with a cavity $c$, all substantially as and for the purposes specified and shown.

In testimony whereof I have hereunto set my hand in the presence of two subscribing witnesses.

JOHN ALFRED STEVENS.

Witnesses:
H. D. JAMESON,
R. F. WILLIAMS.